United States Patent [19]

Mizuno et al.

[11] Patent Number: 5,179,132
[45] Date of Patent: Jan. 12, 1993

[54] PAD FOR AIR BAG DEVICE

[75] Inventors: Hisashi Mizuno; Masahiro Takimoto, both of Inazawa, Japan

[73] Assignee: Toyoda Gosei Co., Ltd., Inazawa, Japan

[21] Appl. No.: 771,561

[22] Filed: Oct. 4, 1991

[30] Foreign Application Priority Data

Oct. 5, 1990 [JP] Japan ................................. 2-268602

[51] Int. Cl.$^5$ ............................................. C08J 9/00
[52] U.S. Cl. .................................... 521/174; 280/728; 521/155; 521/176
[58] Field of Search ...................... 521/174, 176, 155; 280/728

[56] References Cited

U.S. PATENT DOCUMENTS

| | | | |
|---|---|---|---|
| 4,148,503 | 4/1979 | Shiratori et al. | 280/731 |
| 4,852,907 | 8/1989 | Shiraki et al. | 280/731 |
| 5,002,306 | 3/1991 | Hiramitsu et al. | 280/731 |
| 5,110,647 | 5/1992 | Sawada et al. | 428/217 |

Primary Examiner—Morton Foelak
Attorney, Agent, or Firm—Cushman, Darby & Cushman

[57] ABSTRACT

A pad for an air bag device comprising polyurethane material having elongation ratios of 60% or more at 85° C., and 40% or more at −35° C., respectively. The polyurethane material is obtained through reaction of isocyanate mainly formed of diphenylmethane diisocyanate, polyether type polyol with molecular weight of 3,000–8,000 and the functional group number of 2-2.5, and the diol type cross-linking agent with molecular weight of 110 or less.

5 Claims, 2 Drawing Sheets

PAD FOR AIR BAG DEVICE

BACKGROUND OF THE INVENTION

1. Field of the Invention

The present invention relates to a pad for an air bag device located in a steering wheel of an automobile, and more particularly to the material to be used for the pad.

2. Description of the Related Arts

Recently more and more automobiles have been provided with air bags to protect the driver and occupants of the automobile from the effects of a collision. The air bag may be located in the steering wheel, the front panel under the dash board, the back part of the front sheet, and the like.

In a related development, U.S. Pat. No. 4,148,508 (Shiratori et al.) disclose a gas bag and gas generator located in a receiving case at the center portion of the steering wheel. The receiving case included a lid surface on the outside front of the steering wheel. This lid surface has fragile portions which rupture when the gas generator operates to generate large quanties of gas in the gas bag. The receiving portion including the lid surface is made of a thermoplastic elastomer which has sufficient strength so that, when the gas generator operates, the receiving portion fractures only at the fragile portions on the lid surface and nowhere else. The outside of the lid surface is covered by a pad which is made of a material retaining flexbility and being prone to rupture.

U.S. Pat. No. 5,002,306 (Hiramitsu et al.) discloses a similar inflatable air bag device installed in a steering wheel with a pad covering the device. The pad is made of soft synthetic resin such as urethane, polyvinyl chloride, etc. A break-open area defined by a thinned breaking portion in an H-like shape is formed on the upper wall of the pad.

U.S. Pat. No. 4,852,907 (Shiraki et al.) discloses a similar inflatable air bag device installed in a steering wheel with a pad covering the device. The pad is designed so that an insert can be molded integrally with the pad. The insert comprises a rectangular tubular base portion made from a synthetic resin and a plurality of flexible nets.

As shown in FIGS. 1 and 2, an air bag 21 is located in the central portion of a steering wheel 15. A pad 10 for the air bag device is provided around the upper periphery of the air bag 21 at the driver's side.

The pad 10 is provided with a schematic H shaped slit 11 from where the pad 10 ruptures at the inflation of the air bag 21. Both upper and lower surfaces of the pad 10 are provided with the slit 11 and a thin wall portion 110 is provided between the upper surface slit 11 and the lower surface slit 11. (See FIG. 3.)

As shown in FIG. 1, a switch 31 is turned on at an electrical circuit to heat a heater 33, resulting in a large amount of gas 29 generated through a gas foaming agent 25. The gas 29 is quickly supplied into the air bag 21 to inflate the air bag rapidly. Then the air bag 21 bursts through the thin wall portion 110 and expands in front of the driver to protect the driver's face.

During the above inflation of the air bag, it is most efficient to have the pad rupture along a rupture line 41 at the thin wall portion 110 between upper and lower slits 11 as shown in FIG. 3.

However, as shown in FIG. 4, the pad 10 ruptures in an abnormal and undesirable way along a line 42 out of the thin wall portion 110.

Accordingly various examinations were made in order to produce a normal rupture as shown in FIG. 3, i.e., the rupture occurring along with or close to the rupture line 41 at the thin wall portion, leading to the present invention.

SUMMARY OF THE INVENTION

It is an object of the present invention to provide a pad for an air bag device which is enabled to cause normal rupture at the inflation of the air bag.

The present invention is characterized by the pad for the air bag device formed of foamed polyurethane material with elongation ratios of 60% and more at 85° C., and 40% or more at −35° C., respectively.

The present invention is further characterized by the polyurethane material used to form the pad. This polyurethane material is obtained through reaction of isocyanate mainly formed of prepolymer of a diphenylmethane diisocyanate, a polyether-type polyol having a molecular weight of from 3,000 to 8,000 and a functional group number of from 2 to 2.5, and a diol type cross-linking agent having a molecular weight of less than or equal to 110.

Other objects, features and advantages of the present invention will become apparent on consideration of the following description and the appended claims, with reference to the accompanying drawings, all of which form a part of this specification.

BRIEF DESCRIPTION OF THE DRAWINGS

FIG. 1 is a sectional view taken along line A—A of FIG. 2 showing the air bag accommodated in a steering wheel and the pad covered thereon.

FIG. 2 is a plane view of FIG. 1.

FIG. 3 is a partial perspective view showing a normal rupture of the pad for the air bag.

FIG. 4 is a partial perspective view showing an abnormal rupture of the pad for the air bag.

DETAILED DESCRIPTION OF THE PREFERRED EMBODIMENT

A pad for an air bag device of the present invention is formed of polyurethane material with its elongation ratio determined according to the temperature as aforementioned. It is, thus, necessary for the material to have elongation ratios of 60% or more at high temperature of 85° C. and 40% or more at low temperature of −35° C., respectively.

Figure 4:
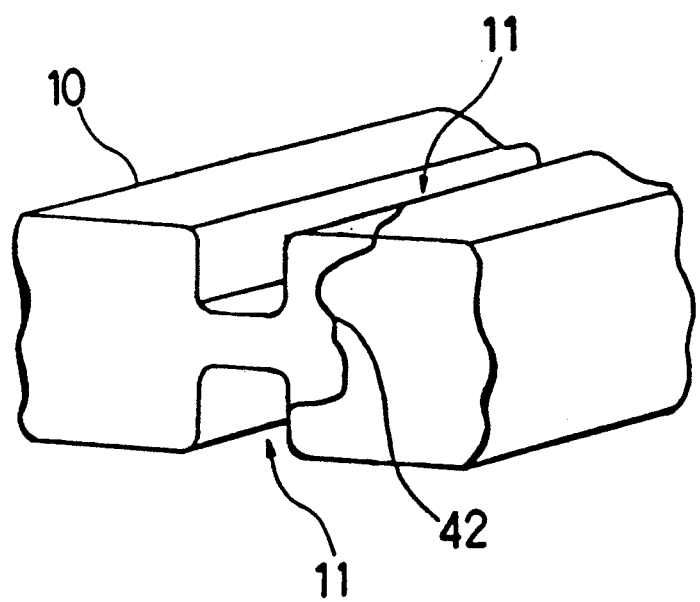

If the elongation ratio either at high or low temperature is lower than the above value, it is likely to cause an abnormal rupture as shown in FIG. 4, rather than a normal one.

Figure 3:
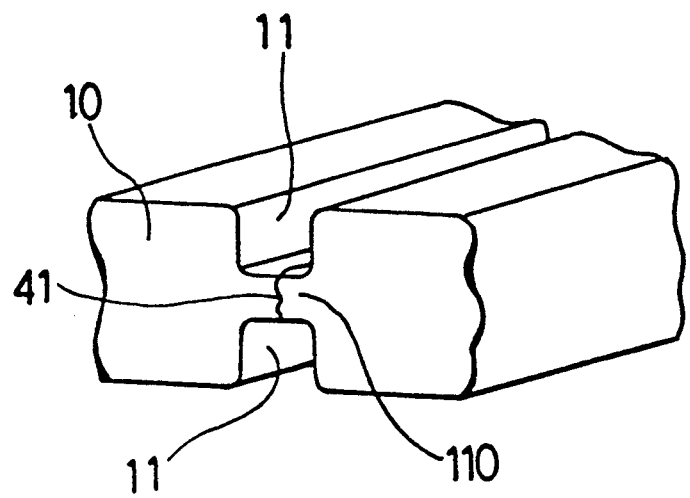

In a preferred embodiment, the material has elongation ratios of 65% or more at 85° C. and 70% or more at −35° C., which causes the rupture to be only at the thin wall portion as shown in FIG. 3.

The aforementioned foamed polyurethane material is preferably formed through the reaction of isocyanate, mainly composed of prepolymer of diphenylmethane diisocyanate polyether type polyol with molecular weight of 3,000–8,000 and the functional group number of 2–2.5, and the diol type cross-linking agent with molecular weight of 110 or less. The foamed polyurethane material also has catalyst, foaming agent, and pigment added to the mixture to obtain reaction.

The above formed foamed polyurethane material has the elongation ratios as described above which achieve the desired rupture conditions. The diol type cross-linking agent with molecular weight of 110 or less may be formed of ethylene glycol, diethylene glycol, propylene glycol, 1.4 butane diol, and the like.

The pad for the air bag device of the present invention has excellent elongation ratios at both high and low temperatures.

Covered over the peripheral surface of the air bag, the pad will normally rupture at the thin wall portion upon inflation of the air bag to the desired degree of expansion.

The present invention is able to provide a pad for an air bag device having a normal rupture at the inflation of the air bag.

EXAMPLES 1-4, Comparative Examples C1-C5

The foamed polyurethane material was prepared by mixing at various weight ratios: isocyanate mainly formed of prepolymer of diphenylmethane diisocyanate, polyether type polyol, and cross-linking agent, as well as adding catalyst, foaming agent, and pigment to the mixture for reaction.

Table 1 shows the mixture ratios of the respective components by weight.

Figure 1:
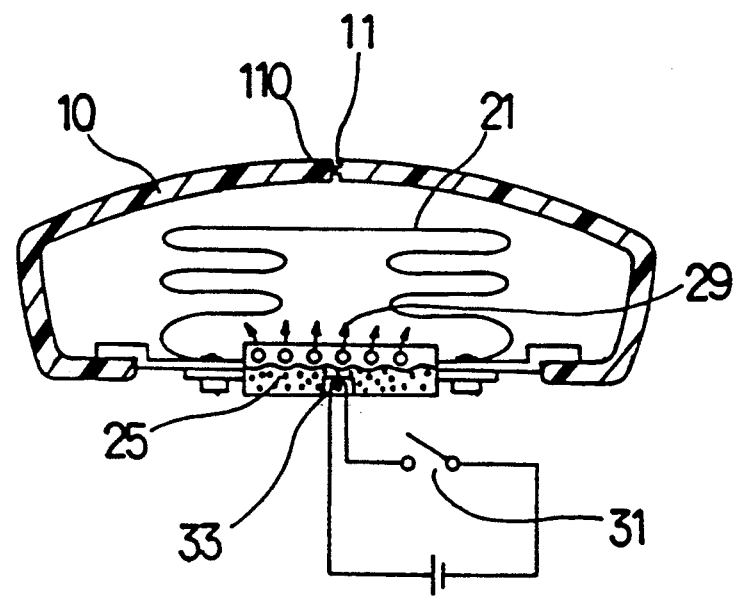
FIGS. 1–4 are explanatory views of a pad for an air bag device.
Figure 2:
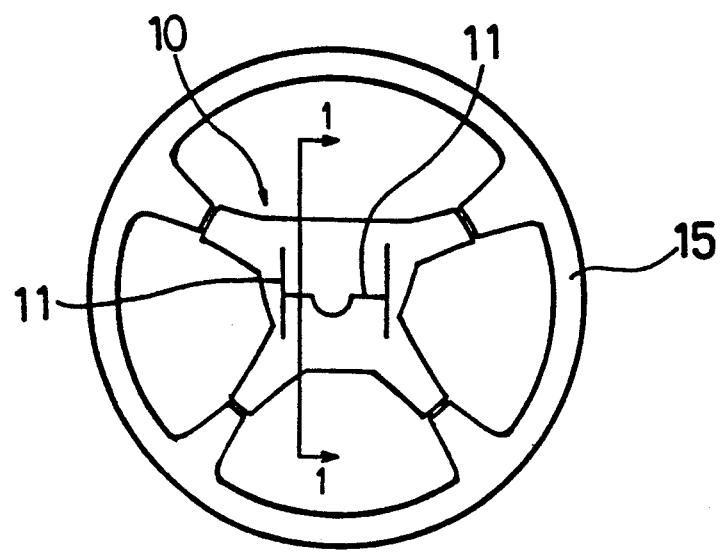

The pad for the air bag device was made as shown in FIG. 1 by using the above polyurethane material. Then respective states of rupture are measured and shown in Table 2.

The mixture shown in Table 1 was formed into foamed polyurethane material through reaction injection molding (RIM).

The respective components of Table 1 are as follows.
Polyol A:
  Functional group number 2, Molecular weight (MW) 4,000;
Polyol B:
  Functional group number 2.5, Molecular weight 5,000;
Cross-linking agent:
  Diethylene glycol (DEG);
Isocyanate A:
  Diphenylmethane diisocyanate (NCO 23%);
Isocyanate B:
  Diphenylmethane diisocyanate (NCO 28%);
Catalyst:
  DABCO 33LV produced by Sankyo Air Products (an ethylene diamine);
Foaming agent:
  Flon 11 (9-10% by weight);
Pigment:
  Pigment paste (Color: Brown).

The pad subjected to the measurement test had a thickness of 6-7 mm, a slit width of 1.3 mm, and a thin wall portion thickness of 0.9 mm. The pad was equipped so as to cover the air bag accommodated in a steering wheel as shown in FIG. 1. Then the air bag was inflated to break the pad. The surface of the ruptured pad was measured.

The measurement results are shown in Table 2 along with basic properties such as elongation ratios at 85° C., 20° C., and −35° C., and tensile strength (kgf/cm² at 20° C.). The ratings of the rupture state, A and B at 85° C. and −35° C. are also shown in the Table 2.

The rating A represents a normal rupture state as shown in FIG. 3 which produces a rupture line 1-2 at the thin wall portion. The rating B represents an abnormal rupture state as shown in FIG. 4 which produces a rupture line at the thick wall portion.

In these examples, an A rated pad both at 85° C. and −35° C. was rated as good. While a B rated pad either at 85° C. or −35° C. was rated as no good.

Tables 1 and 2 show comparative examples C1-C5 as well as examples 1-4.

As can be seen from those Tables, examples 1-4 of the present invention show elongation ratio of 60% or more at 85° C., and 40% or more at −35° C., respectively, resulting in A ratings at both temperatures. The comparative examples C1-C5 showed relatively higher elongation ratios of 75% or more at −35° C. However, the ratio at 85° C. was relatively low, 55% or less. The rupture ratings were A at −35° C., while the ratings were B at 85° C. As a result, all of the comparative examples were rated no good.

In examples 1-4, diethylene glycol with molecular weight of 110 or less was used as the diol type cross-linking agent, leading to excellent rupture properties.

EXAMPLES 5-7, Comparative Examples C6-C8

The same measurement as above was conducted using different types of cross-linking agents as shown in Table 3. The measurement results are shown in Table 4.

In Table 3, ethylene glycol (EG) or 1.4-butane diol (1.4 BD) was used as the cross-linking agent. Other components were the same as those used in Examples 1-4.

Tables 3 and 4 show the Comparative Examples C6-C8 as well as the Examples 5-7. As can be seen from both Tables, the Examples of the present invention show high elongation ratios of 65% or more at 85° C. and 70% or more at −35° C., respectively, resulting in A ratings at both temperatures.

On the contrary, the Comparative Examples show relatively high elongation ratios at −35° C., but with 58% or less at 85° C. The Comparative Examples all attain a B rating at 85° C. (at −35° C. all of them attain an A rating), resulting overall in a rating of no good.

In the Examples 5-7, ethylene glycol (EG) and 1.4 butane diol with molecular weight of 110 or less were used as the diol type cross-linking agent, resulting in excellent rupture properties.

While the invention has been described with reference to several examples, it is to be understood that modifications or variations may be easily made by a person of ordinary skill in the art without departing from the spirit and scope of the present invention which is defined by the appended claims.

TABLE 1

| Mixture | Examples | | | | Comparative examples | | | | |
| --- | --- | --- | --- | --- | --- | --- | --- | --- | --- |
|  | 1 | 2 | 3 | 4 | C1 | C2 | C3 | C4 | C5 |
| Polyol A/Polyol B ratio | 100/0 | 50/50 | 0/100 | 100/0 | 50/50 | 0/100 | 100/0 | 50/50 | 0/100 |
| Cross-linking agent | DEG | ← | ← | ← | ← | ← | ← | ← | ← |
| Catalyst | DABCO 33LV | ← | ← | ← | ← | ← | ← | ← | ← |

TABLE 1-continued

| Mixture | Examples | | | | Comparative examples | | | | |
|---|---|---|---|---|---|---|---|---|---|
| | 1 | 2 | 3 | 4 | C1 | C2 | C3 | C4 | C5 |
| Foaming agent | Flon 11 | ← | ← | ← | ← | ← | ← | ← | ← |
| Pigment | Brown paste | ← | ← | ← | ← | ← | ← | ← | ← |
| Isocyanate A/ Isocyanate B ratio | 100/0 | 100/0 | 100/0 | 50/50 | 50/50 | 50/50 | 0/100 | 0/100 | 0/100 |

[ Polyol A; 2 function, MW 4000,
Polyol B; 2.5 function, MW 5000,
Isocyanate A; NCO 23%.
Isocyanate B; NCO 28% ]

TABLE 2

| Item | Examples | | | | Comparative examples | | | | |
|---|---|---|---|---|---|---|---|---|---|
| | 1 | 2 | 3 | 4 | C1 | C2 | C3 | C4 | C5 |
| Basic property | | | | | | | | | |
| Elongation ratio (%) | | | | | | | | | |
| 85° C. | 122 | 95 | 69 | 63 | 55 | 52 | 51 | 47 | 49 |
| 20° C. | 322 | 286 | 238 | 174 | 159 | 143 | 133 | 119 | 101 |
| −35° C. | 47 | 53 | 51 | 71 | 79 | 75 | 106 | 108 | 90 |
| Tensile strength (kgf/cm$^3$, 20° C.) | 51 | 49 | 42 | 37 | 42 | 41 | 31 | 33 | 36 |
| Rupture analysis | | | | | | | | | |
| 85° C. | A | A | A | A | B | B | B | B | B |
| −35° C. | A | A | A | A | A | A | A | A | A |

TABLE 3

| Mixture | Examples | | | Comparative examples | | |
|---|---|---|---|---|---|---|
| | 5 | 6 | 7 | C6 | C7 | C8 |
| Polyol A/Polyol B ratio | 0/100 | 0/100 | 100/0 | 100/0 | 100/0 | 100/0 |
| Cross-linking agent | EG | 1.4 BD | EG | 1.4 BD | EG | 1.4 BD |
| Catalyst | DABCO 33LV | ← | ← | ← | ← | ← |
| Foaming agent | Flon 11 | ← | ← | ← | ← | ← |
| Pigment | Brown paste | ← | ← | ← | ← | ← |
| Isocyanate A/ Isocyanate B ratio | 100/0 | 100/0 | 50/50 | 50/50 | 0/100 | 0/100 |

TABLE 4

| | Examples | | | Comparative examples | | |
|---|---|---|---|---|---|---|
| | 5 | 6 | 7 | C6 | C7 | C8 |
| Basic property | | | | | | |
| Elongation ratio (%) | | | | | | |
| 85° C. | 85 | 65 | 83 | 58 | 48 | 47 |
| 20° C. | 205 | 192 | 184 | 152 | 126 | 125 |
| −35° C. | 104 | 73 | 95 | 56 | 95 | 66 |
| Tensile strength (kgf/cm$^3$, 20° C.) | 54 | 52 | 46 | 48 | 46 | 41 |
| Rupture analysis | | | | | | |
| 85° C. | A | A | A | B | B | B |
| −35° C. | A | A | A | A | A | A |

What is claimed is:

1. A pad for an air bag device comprising foamed polyurethane material having elongation ratios of 60% or more at 85° C., and 40% or more at −35° C., respectively.

2. The foamed polyurethane material according to claim 1 wherein said material is obtained through reaction of isocyanate mainly formed of prepolymer of a diphenylmethane diisocyanate, a polyether polyol having a molecular weight of from 3,000 to 8,000 and a functional group number of from 2 to 2.5, and a diol type cross-linking agent having a molecular weight of less than or equal to 110.

3. A pad according to claim 1, wherein said elongation ratios of said polyurethane material are 65% or more at 85° C. and 70% or more at −35° C., respectively.

4. The polyurethane material according to claim 3 wherein said material comprises a diphenylmethane diisocyanate having 23% by weight NCO, a diphenylmethane diisocyanate having 28% by weight NCO, polyether polyol having a molecular weight of approximately 4,000 and a functional group number of approximately 2, and a diol cross-linking agent having a molecular weight of less than or equal to 110; wherein said isocyanates are in a one to one proportion by weight.

5. A pad as in claim 1, wherein said diol cross-linking agent is selected from the group consisting of ethylene glycol, diethylene glycol, propylene glycol, and 1.4 butane diol.

* * * * *